(12) United States Patent
Shukuri et al.

(10) Patent No.: US 6,361,849 B1
(45) Date of Patent: Mar. 26, 2002

(54) BENT GLASS SHEET FOR VEHICLES

(75) Inventors: Kyoichi Shukuri; Kazuo Yamada; Takahiro Shimomura, all of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/281,120

(22) Filed: Mar. 29, 1999

(30) Foreign Application Priority Data

Mar. 31, 1998 (JP) .......................................... 10-085655

(51) Int. Cl.[7] ................................................ B32B 3/00
(52) U.S. Cl. ...................... 428/141; 428/192; 428/38; 428/426; 428/410; 428/212; 428/213; 428/220; 296/84.1; 65/61
(58) Field of Search .................................. 428/141, 192, 428/38, 410, 426, 212, 213, 220; 65/61; 296/84.1

(56) References Cited

U.S. PATENT DOCUMENTS

| 1,637,309 A | * | 7/1927 | David ........................ 350/436 |
| 3,895,859 A | * | 7/1975 | Yoshida et al. ......... 350/276 R |
| 4,679,914 A | * | 7/1987 | Rosenberg ................... 350/534 |
| 4,874,654 A | * | 10/1989 | Funaki et al. ............... 428/192 |
| 5,667,897 A | * | 9/1997 | Hashemi et al. ............ 428/426 |
| 5,939,175 A | * | 8/1999 | Sugiura ...................... 428/192 |
| 6,004,655 A | * | 12/1999 | Tanaka et al. .............. 428/192 |

FOREIGN PATENT DOCUMENTS

JP            11-59171        3/1999

* cited by examiner

*Primary Examiner*—William P. Watkins, III
(74) *Attorney, Agent, or Firm*—Merchant & Gould P.C.

(57) ABSTRACT

A bent glass sheet for a vehicle window of the present invention has a roughened region for eliminating distortion of transmitted light through the bent glass sheet. The bent glass sheet comprises a main surface surrounded by an edge of the bent glass sheet and the main surface has a smooth transparent region. The main surface also has the roughened region that covers at least a portion of a peripheral region of the main surface and in the portion of the peripheral area the roughened region extends at least 3 mm from the edge of the bent glass sheet. The roughened region covers an area in which the transmitted light are distorted. Therefore, the discomfort of passengers due to distortion of transmitted light is relieved.

12 Claims, 9 Drawing Sheets

BENT GLASS SHEET FOR VEHICLES

BACKGROUND OF THE INVENTION

1. Field of the Invention

The present invention relates to a bent glass sheet for a vehicle window, especially for an automobile window.

2. Description of the Prior Art

In the field of window glass for vehicles, especially automobiles, there is a large need for bent glass sheets, owing to, among other things, design and aerodynamic considerations. In a first step, the glass sheet is formed into a flat plate, usually by a float process. In a second step, the flat glass sheet is bent. In this second step, first, the glass sheet has to be heated to a temperature near the softening point to make it shapeable. Then, the glass sheet is bent by pressing or self-sagging using a mold with a predetermined shape. When a heated glass sheet is quenched, a compressive layer develops in the surface of the glass sheet. Therefore, after heating and bending the glass sheet in the second step, it is often quenched by blowing air onto it to obtain a bent tempered glass.

A ceramic paste can be printed and baked onto a part of the surface of the bent glass sheet to form a nontransparent layer, which may be esthetically preferable to make the glass fitting portion in, for example, the back window, invisible from the outside. Such a ceramic mask is usually formed as a black frame on the surface of the glass sheet.

Even if the glass sheet is made partially nontransparent, the larger portion of the surface of the bent glass sheet has to be kept transparent to function as a window. The main function of the vehicle window glass is not only to transmit light, but also to convey the situation on the outside accurately to the passengers (especially the driver). Consequently, an improvement of the above second step was to maintain the extremely high smoothness that was obtained by the float process. For example, when a glass sheet is bent and tempered while being suspended with tongs, small tong marks can worsen the appearance of the glass sheet. Methods have been developed to bend and temper a glass sheet without using tongs.

Whether tongs are used or not, strains remain at a peripheral surface portion of the bent glass sheet that are difficult to eliminate completely. These strains can be attributed to the heat history of the glass sheet: The glass sheet has been heated to a temperature near the softening point, and then cooled. In general, the strains due to the heat history remaining at a periphery of a main surface of the glass sheet are minor. However, since the distortion of incident light in the other regions of the bent glass sheet is kept at a very low level, the distortions at a peripheral portion are relatively noticeable. Especially, when a side door window of an automobile is partially open, the distortion of transmitted light (or sometimes reflected light) can be a cause of discomfort to the driver or other passengers.

SUMMARY OF THE INVENTION

Therefore, it is an object of the present invention to provide a bent glass sheet for a vehicle window, wherein the discomfort of passengers due to distortion of transmitted light is reduced.

In order to attain this object, a bent glass sheet of the present invention comprises a main surface surrounded by an edge of the bent glass sheet and the main surface has a smooth transparent region. The main surface also has a roughened region that covers at least a portion of a peripheral region of the main surface and in the portion of the peripheral area the roughened region extends at least 3 mm from the edge of the bent glass sheet.

With such a bent glass sheet, the passengers do not feel discomfort due to distortion of transmitted light. If the goal were to simply block transmitted light, it would also be possible to use ceramic masking, which is a well-known technology in the field of automotive window glass making. However, if a part of the surface of the glass sheet is not transparent, it will cause a feeling of uneasiness in the passenger. The above-described bent glass sheet, however, has a roughened surface region, which only scatters incident light.

Throughout this specification, "light" means more precisely "visible light", as should become clear from the object of the present invention. Consequently, "roughened region" means a region having such irregularities that scatter transmitted (or reflected) visible light. Such a roughened region can be formed by roughening a part of a transparent region having a surface that is so smooth that it does not scatter transmitted light. Moreover, "main surface" means a front/back surface pair of a glass sheet without the edge surface.

The roughened surface region in the bent glass sheet of the present invention is roughened by abrading the transparent region. Often, edge surfaces of vehicle window glasses are abraded. Consequently, the manufacturing steps can be simplified if a portion of the principle surface is roughened by abrading as well.

DESCRIPTION OF THE PREFERRED EMBODIMENTS

Figure 1:
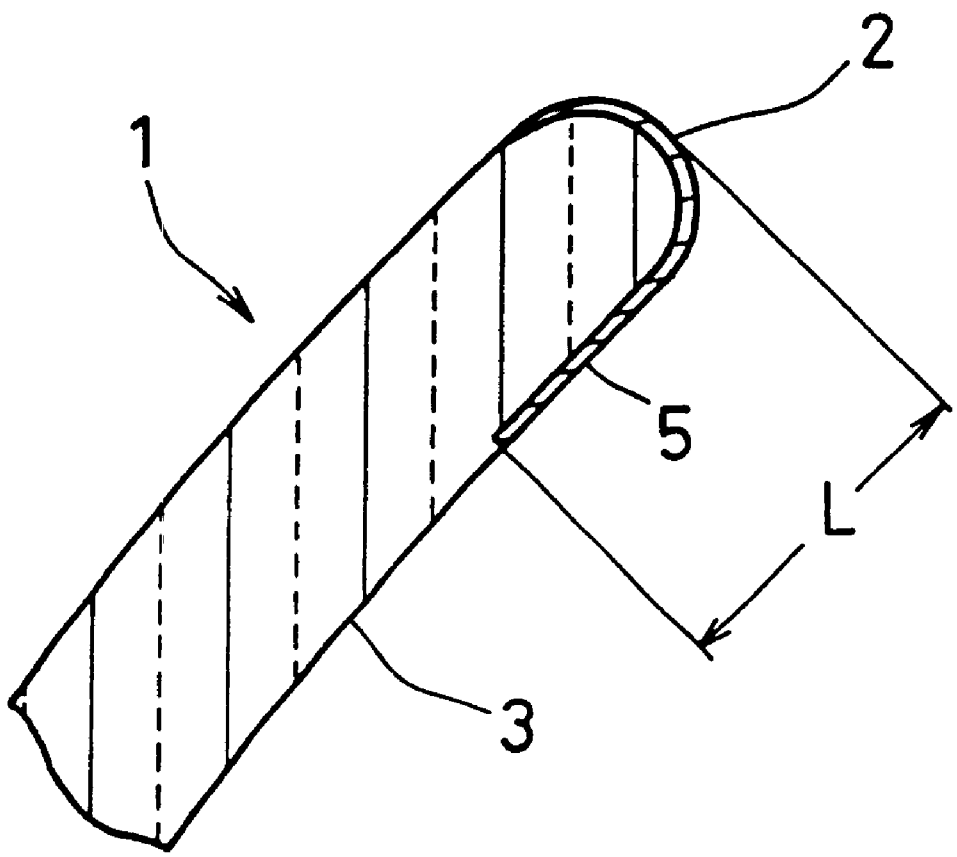
FIG. 1 is a cross-sectional view of an edge portion in an embodiment of a bent glass sheet according to the present invention.

The following is an explanation of the preferred embodiments of the present invention with reference to the accompanying drawings. FIG. 1 is a cross-sectional drawing showing the edge of a bent glass sheet in a first embodiment of the present invention. An edge surface 2 of this glass sheet 1 has a convex curved shape. This edge surface shape, called a "round edge", is often used for vehicle glass sheets, such as for automobiles. In the edge surface 2, there are no defects (cracks) that can develop into the starting point for breakage when the heated glass sheet is quenched. However, the glass sheet is not polished to mirror quality as can be found in the end face of glass sheets in, for example, glass tables, but is rough enough to scatter incident light.

As is shown in FIG. 1, the main surface on one side of the glass sheet 1 comprises a roughened surface region 5. As the edge surface 2, the roughened surface region 5 is also roughened to the point that it scatters incident light. Thus, the roughened surface region 5 of the glass sheet is translucent, but not completely transparent. On the other hand, outside the roughened surface region 5, the main surface of the glass sheet 1 has a transparent region 3 where the smoothness of the surface is maintained. This transparent region 3 maintains the high surface smoothness that has been brought about by the float process. Moreover, the roughened surface region 5 is formed from the edge of the glass sheet, and extends a length L into the glass sheet.

Figure 9:
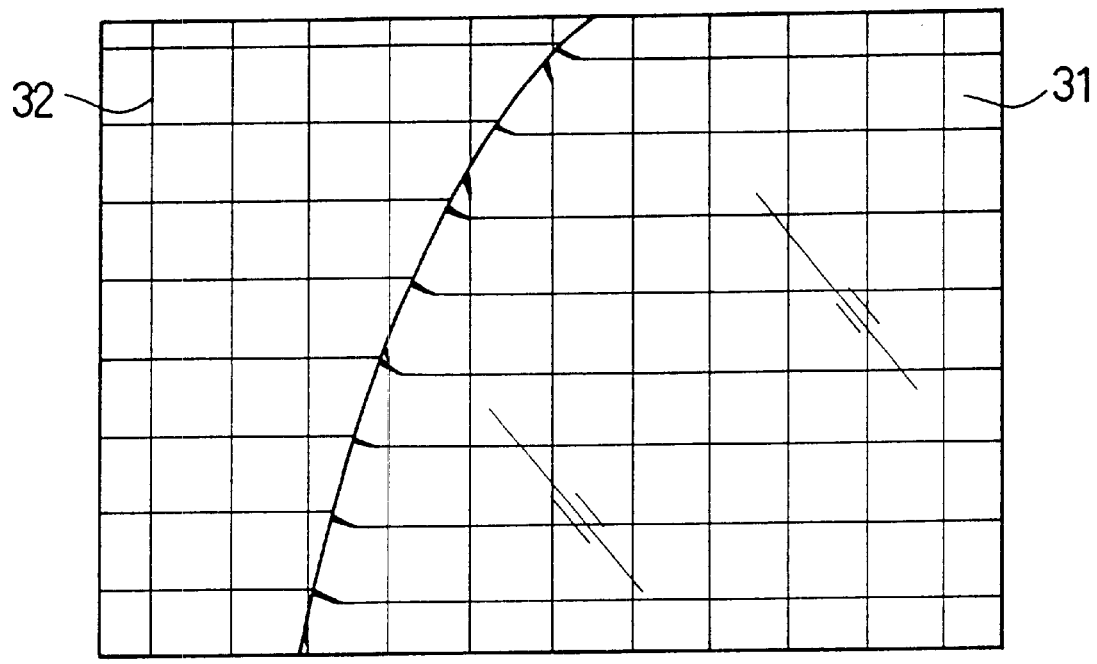
FIG. 9 is a plan view of a conventional bent glass sheet, shown with a mesh test pattern.

In order to determine a value for the length L, we observed the strain of several bent glass sheets that were manufactured as actual window glasses for automobiles. FIG. 9 shows an example of these observations. FIG. 9 is a drawing that schematically shows the distortion of a mesh pattern observed through a glass sheet that has been heated to a temperature near the softening point and bent. Owing to the strain in a peripheral region of the principle surface 31 of the bent glass sheet, the straight lines 32 that are arranged at equal distances vertically and horizontally appear to be distorted. On the other hand, this distortion could not be observed in a central region of the principle surface. The region where this distortion could be observed follows a band along the edge of the glass sheet.

As a result of this observation, it could be established that if the principle surface within at least 3 mm from the edge of the glass sheet is roughened (that is, L is at least 3 mm), the above-described distortion cannot be observed. On the other hand, in order not to restrict the transparent region 3 more than necessary, it is preferable that the length of L is not more than 20 mm. It is preferable that the length of L is at least 5 mm, more preferably at least 7 mm, and preferably not more than 15 mm.

Figure 2:
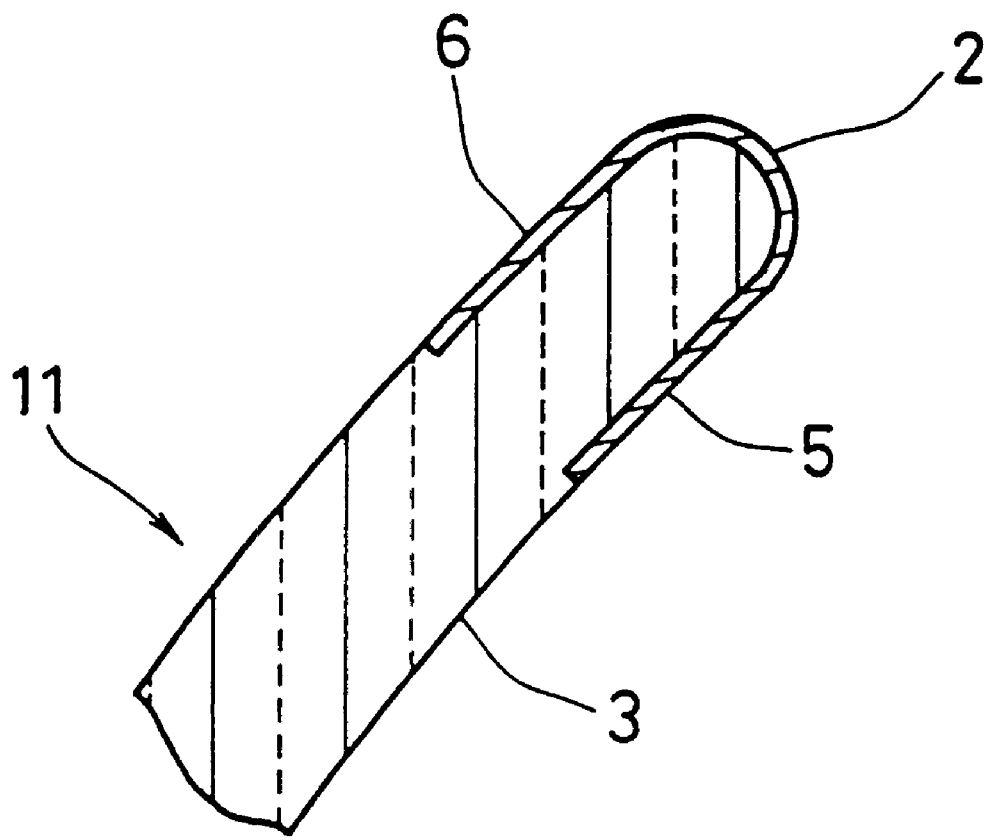
FIG. 2 is a cross-sectional view of an edge portion in another embodiment of a bent glass sheet according to the present invention.

FIG. 2 is a cross-sectional drawing of the edge of a bent glass sheet according to another embodiment of the present invention. What is different from the glass sheet 1 is that this glass sheet 11 comprises roughened surface regions 5 and 6 on both main surfaces. Thus, when roughened surface regions are formed on both surfaces, it is preferable that the length $L_1$, of a first roughened surface region is in the preferable range described above, and that the length $L_2$ of a second roughened surface region can be smaller than $L_1$.

Figure 3:
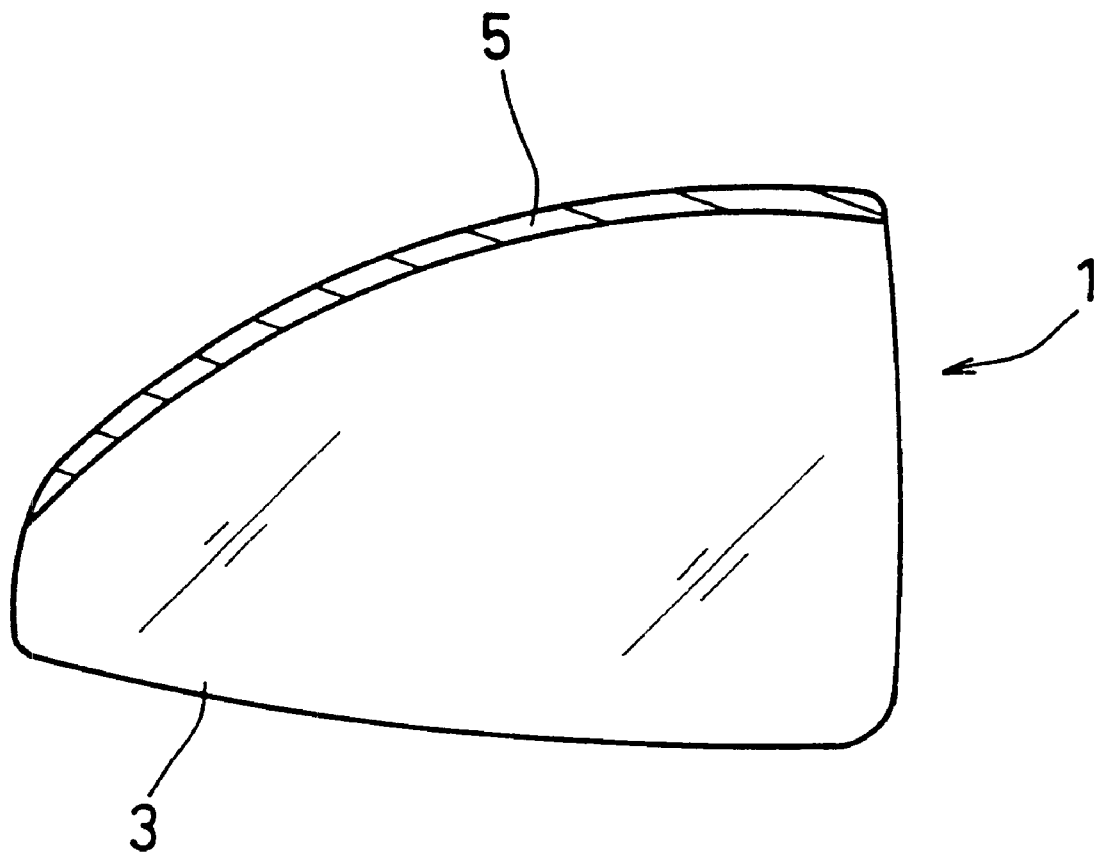
FIG. 3 is a plan view of an embodiment of a bent glass sheet according to the present invention.

FIG. 3 is a plan view of the glass sheet shown in FIG. 1: The roughened surface region 5 does not have to be formed at all peripheral regions of the glass sheet, and it is sufficient if the roughened surface region is formed for at least a portion of the peripheral regions. In the example shown in FIG. 3, the roughened surface region 5 is formed only on the upper side of the glass sheet that can be exposed to air if it is used in a door window that can be opened and closed. The range over which the roughened surface region 5 is formed should be adapted to the intended use of the glass sheet. For example, the roughened surface region 5 can also be formed all around the glass sheet 12 except at the lower portion as in another example, shown in FIG. 4. Or, the roughened surface region 5 can also be formed in a band completely around the glass sheet. Moreover, the width of the roughened surface region does not have to be constant.

Figure 4:
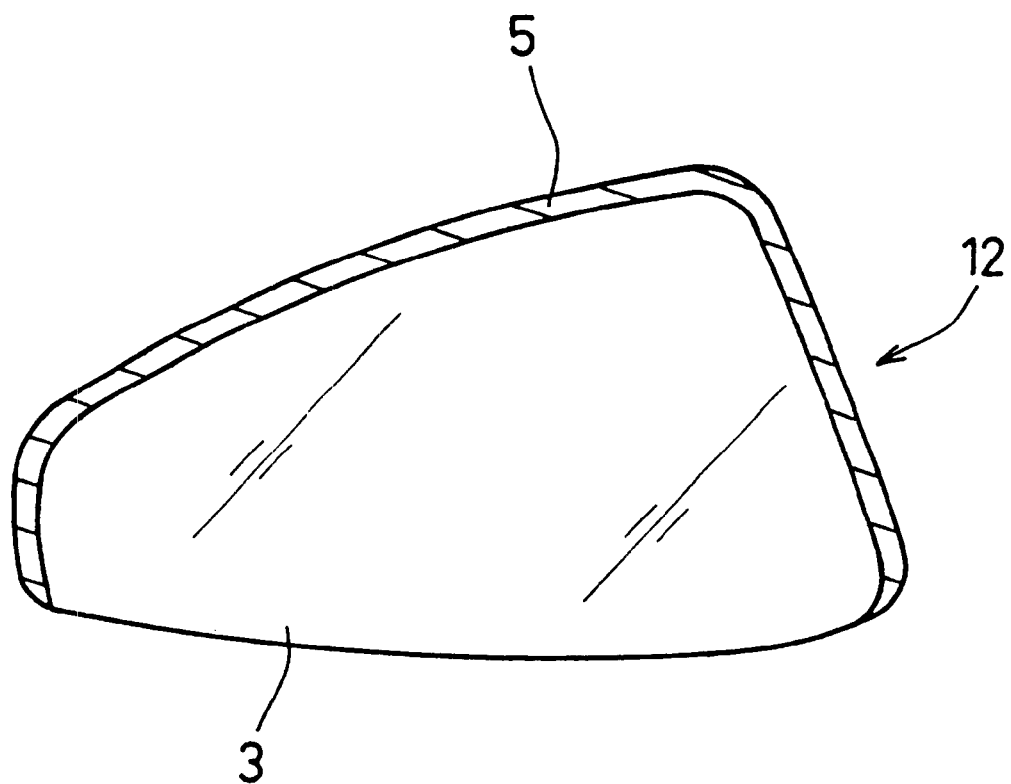
FIG. 4 is a plan view of another embodiment of a bent glass sheet according to the present invention.

As is shown in FIGS. 3 and 4, the main surface of the glass sheet outside the roughened surface region 5 remains basically as the transparent region 3, but this region also can be partially nontransparent or obscured. Moreover, it also can be partially perforated.

Figure 5:
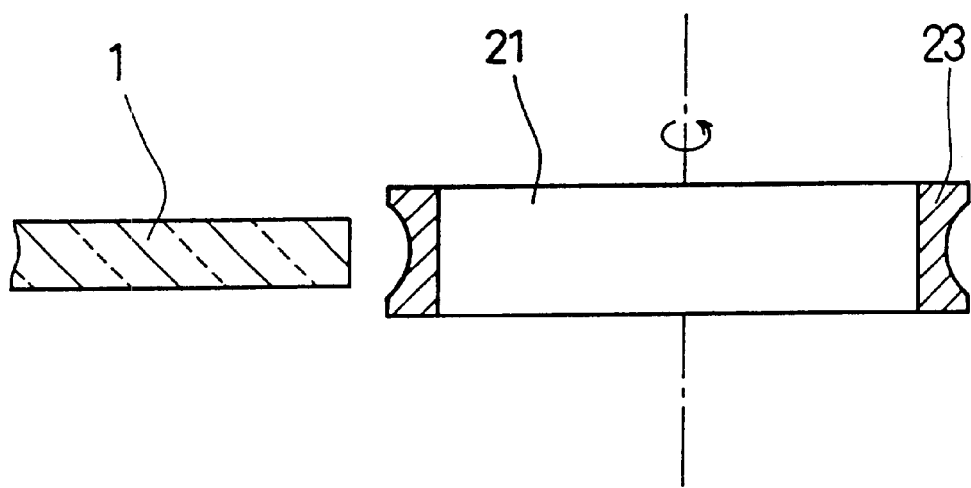
FIG. 5 is a cross-sectional view for illustrating an embodiment of a method for abrading an edge surface portion of a glass sheet.

The following is an explanation of an example of a method for manufacturing a bent glass sheet in accordance with the present invention: For this method, a flat glass sheet is used that has been manufactured by a float process and cut into an appropriate shape. First of all, an edge surface of this glass sheet is abraded. A cylindrical wheel 21 as shown for example in FIG. 5 can be used for this abrasion. This cylindrical wheel 21 has a concave grinding portion 23 on its side face. The edge of the glass sheet 1 is formed into a round edge as in shown in FIG. 1 by grinding with such a wheel 21.

Figure 6:
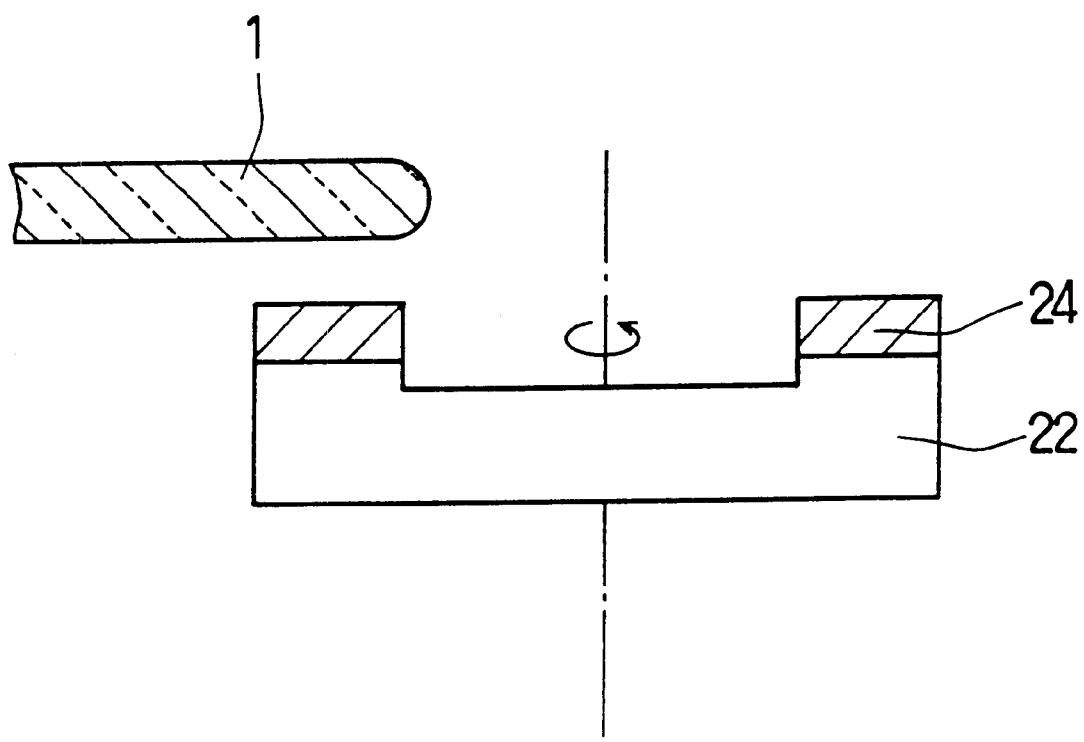
FIG. 6 is a cross-sectional view for illustrating another embodiment of a method for abrading an edge surface portion of a glass sheet.

A peripheral region of the main surface of the glass sheet 1 is abraded along the edge surface. For this abrasion, a cylindrical wheel having a grinding portion on its side can be used, as explained above, but it is also possible to use a coupling wheel 22 having a grinding portion 24 on top of a revolving face, as shown in FIG. 6. With such grinding, a roughened surface region is formed on the peripheral portion of at least one main surface of the glass sheet.

Of course, the main surfaces and the edge surface can also be abraded by other means, such as a belt instead of the wheels described above.

The method for forming the roughened surface region is not limited to grinding. Instead of grinding, the glass surface can also be eroded by blowing small particles onto it; a typical example for this method is sandblasting. The glass surface can also be etched with, for example, hydrofluoric acid, or an irregular layer having of, for example, translucent ink can be imprinted on the glass surface. It is also possible to combine two or more of these methods. However, because with grinding the edge surface and the principle surfaces can be abraded at the same time, this method is more efficient for forming a roughened surface than the other methods.

After the roughened surface region 5 has been formed, the glass sheet is heated to a temperature where it is formable, and it bent along a mold having an appropriate shape. The temperature to which the glass sheet is heated is usually a temperature near the softening point of the glass, for example a temperature that is above the straining point and below the softening point of the glass. Often, the shaped glass sheet is quenched with air to make it into tempered glass, but this is not mandatory, and the glass sheet also can be cooled slowly. Concerning the bending step (or the bending and cooling step), there are no limitations to any particular conventional method and any suitable method can be used.

Thus, a bent glass sheet for vehicle window can be manufactured in accordance with the present invention. Other parts can be attached to this bent glass sheet, if necessary, and the bent glass sheet is inserted into a vehicle window.

The bent glass sheet of the present invention can be thinner in the roughened surface region than in other portions including the transparent regions. To be specific, when a roughened surface region is formed by abrasion, different thicknesses can be attained easily by abrading the roughened surface region of the glass sheet with an abrasion means such as a grinding wheel.

Figure 7:
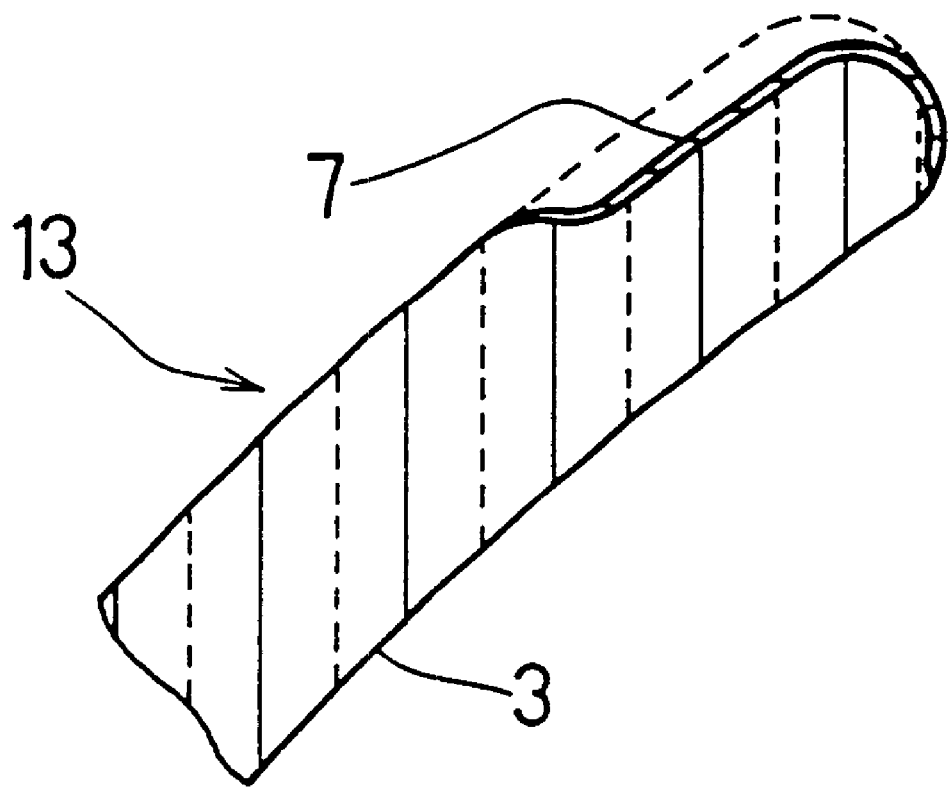
FIG. 7 is a cross-sectional view of an edge portion in another embodiment of a bent glass sheet according to the present invention.
Figure 8:
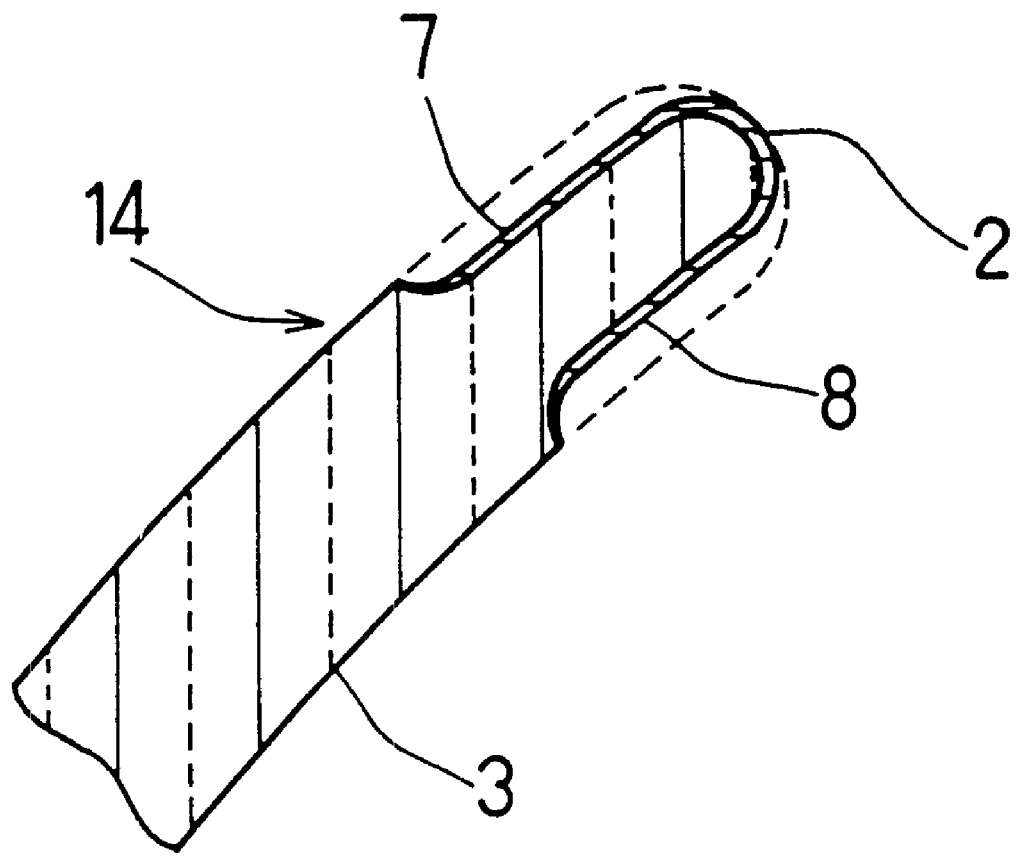
FIG. 8 is a cross-sectional view of an edge portion in another embodiment of a bent glass sheet according to the present invention.

Embodiments of such bent glass sheets are shown in FIGS. 7 and 8. In the main surfaces of these glass sheets, steps have been formed by abrasion.

The shape for the bent glass sheet of the present invention is not limited to the above shapes. For example, the shape of the edge surface of the glass sheet does not necessarily have to be a round edge. And, as long as the object of the present invention is not impeded, there is no particular restriction concerning the shape of the edge surface. Also, the shape of the glass sheet is not limited to the shapes in FIGS. 3 and 4, but can be any shape that is appropriate for a vehicle window. Moreover, the glass sheet also can be a laminated glass sheet or a compound glass sheet. Other than serving as the window of a vehicle, there is no particular limitation as to the location where the bent glass sheet is employed. In an automobile, for example, it can be used as a side window, a roof window, a back window, or a windshield. However, it is preferable that the bent glass sheet of the present invention is used for a window that can be opened and closed by a power window mechanism, whence its effect is considerable.

As has been pointed out above, a bent glass sheet in accordance with the present invention distortions of transmitted light at a peripheral portion of the bent glass sheet can be eliminated, and the discomfort of passengers due to these distortions can be relieved.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A bent and tempered inorganic glass for a vehicle window comprising a main surface surrounded by an edge of the bent and tempered inorganic glass sheet, the main surface having a smooth transparent region, wherein the main surface has a roughened region covering at least a portion of a peripheral region of the main surface and in the portion of the peripheral region the roughened region extends at least 3 mm from the edge of the bent and tempered inorganic glass sheet.

2. The bent and tempered inorganic glass sheet according to claim 1, wherein the roughened region is formed by abrading a portion of the smooth transparent region.

3. The bent and tempered inorganic glass sheet according to claim 1, wherein in the portion of the peripheral region the roughened region extends at least 5 mm from the edge of the bent and tempered inorganic glass sheet.

4. The bent and tempered inorganic glass sheet according to claim 1, wherein in the portion of the peripheral region the roughened region extends at least 7 mm from the edge of the bent and tempered inorganic glass sheet.

5. The bent and tempered inorganic glass sheet according to claim 1, wherein in the portion of the peripheral region the roughened region extends 20 mm or less from the edge of the bent and tempered inorganic glass sheet.

6. The bent and tempered inorganic glass sheet according to claim 1, wherein in the roughened region the bent and tempered inorganic glass sheet is thinner than in the smooth transparent region.

7. A bent and tempered inorganic glass sheet for a vehicle window comprising a pair of main surfaces, each main surface of the pair being surrounded by an edge of the bent and tempered inorganic glass sheet and having a smooth transparent region, wherein each main surface of the pair has a roughened region covering at least a portion of a peripheral region of the main surface and in the portion of the peripheral region in at least one of the main surfaces the roughened region extends at least 3 mm from the edge of the bent and tempered inorganic glass sheet.

8. The bent and tempered inorganic glass sheet according to claim 7, wherein the roughened region is formed by abrading a portion of the smooth transparent region.

9. The bent and tempered inorganic glass sheet according to claim 7, wherein in the portion of the peripheral region in at least one of the main surfaces the roughened region extends at least 5 mm from the edge of the bent and tempered inorganic glass sheet.

10. The bent and tempered inorganic glass sheet according to claim 7, wherein in the portion of the peripheral region in at least one of the main surfaces the roughened region extends at least 7 mm from the edge of the bent and tempered inorganic glass sheet.

11. The bent and tempered inorganic glass sheet according to claim 7, wherein in the portion of the peripheral region in at least one of the main surfaces the roughened region extends 20 mm or less from the edge of the bent and tempered inorganic glass sheet.

12. The bent and tempered inorganic glass sheet according to claim 7, wherein in the roughened region the bent and tempered inorganic glass sheet is thinner than in the smooth transparent region.

* * * * *

UNITED STATES PATENT AND TRADEMARK OFFICE
CERTIFICATE OF CORRECTION

PATENT NO. : 6,361,849 B1 Page 1 of 1
DATED : March 26, 2002
INVENTOR(S) : Shukuri et al.

It is certified that error appears in the above-identified patent and that said Letters Patent is hereby corrected as shown below:

<u>Title page,</u>
Item [73], Assignee, "Matsushita Electric Industrial Co., Ltd." should read
-- Nippon Sheet Glass Co., Ltd. --

Signed and Sealed this

First Day of October, 2002

Attest:

Attesting Officer

JAMES E. ROGAN
*Director of the United States Patent and Trademark Office*